United States Patent [19]

Hegg et al.

[11] Patent Number: 5,278,532

[45] Date of Patent: Jan. 11, 1994

[54] AUTOMOTIVE INSTRUMENT VIRTUAL IMAGE DISPLAY

[75] Inventors: Ronald G. Hegg, Inglewood; Ronald T. Smith, Redondo Beach; Mao-Jin Chern, Rancho Palos Verdes; John J. Ferrer, Los Angeles, all of Calif.

[73] Assignee: Hughes Aircraft Company, Los Angeles, Calif.

[21] Appl. No.: 96,870

[22] Filed: Sep. 14, 1987

[51] Int. Cl.$^5$ .......................... G02B 27/10; G02F 1/13
[52] U.S. Cl. ........................................ 345/7; 359/13; 345/2
[58] Field of Search ............ 340/97, 705, 980, 815.31; 350/174, 331; 353/14; 424/44; 358/252; 359/13, 19, 48, 869

[56] References Cited

U.S. PATENT DOCUMENTS

| | | | |
|---|---|---|---|
| 1,351,562 | 8/1920 | Foster | 340/815.31 |
| 2,641,159 | 6/1953 | Mihalakis | 353/14 |
| 2,819,459 | 1/1958 | Dodd | 358/252 |
| 3,109,063 | 10/1963 | Parker | 358/252 |
| 3,549,803 | 12/1967 | Becht et al. | 350/174 |
| 3,697,154 | 10/1972 | Johnson | 340/705 |
| 3,848,974 | 11/1974 | Hosking et al. | 353/14 |
| 3,915,548 | 10/1975 | Opittek et al. | 350/174 |
| 3,940,204 | 2/1976 | Withrington | 350/174 |
| 4,153,913 | 5/1979 | Swift | 358/93 |
| 4,190,832 | 2/1980 | Mohler | 350/174 |
| 4,263,594 | 4/1981 | Masucci | 340/815.31 |
| 4,294,515 | 10/1981 | Kautman | 350/174 |
| 4,299,447 | 11/1981 | Soltan et al. | 350/331 R |
| 4,361,384 | 11/1982 | Bosserman | 350/174 |
| 4,372,639 | 2/1983 | Johnson | 350/331 R |
| 4,483,585 | 11/1984 | Takami | 350/96.24 |
| 4,623,223 | 11/1986 | Kempf | 350/138 |
| 4,635,033 | 1/1987 | Inukai et al. | 340/97 |
| 4,653,867 | 3/1987 | Urabe et al. | 350/345 |
| 4,740,780 | 4/1988 | Bronn et al. | 340/705 |
| 4,880,287 | 11/1989 | Moss | 350/3.85 |

FOREIGN PATENT DOCUMENTS

| | | |
|---|---|---|
| 0005245 | 11/1979 | European Pat. Off. |
| 0202460 | 11/1986 | European Pat. Off. |
| 0200407 | 12/1986 | European Pat. Off. |
| 2169403 | 9/1973 | France |
| 2411436 | 7/1979 | France |

Primary Examiner—Alvin E. Oberley
Assistant Examiner—Steven J. Saras
Attorney, Agent, or Firm—L. A. Alkov; W. K. Denson-Low

[57] ABSTRACT

A compact, inexpensive and mass-producible optical display system for an automobile creates a highly visible and sharp, high contrast and pleasing, multi-color magnified virtual image of a primary instrument cluster at a viewing distance which is greater than the actual optical distance between the dashboard and the driver's eyes in order to enhance instrument readability, minimize driver eye strain, and reduce eye focus problems which are associated with transitioning between the far range viewing used for watching the road ahead and the near range viewing used for glancing at the instruments. A non-pupil forming display system uses a single off-axis aspherical mirror with power to create a virtual image of a miniaturized, multi-color passive image source, such as a segmented LCD panel, which is back-lighted by a small filament incandescent light bulb. The aspheric surface is optimized to minimize aberrations and reduce vertical disparity and field curvature. The image source is pre-distorted to compensate for distortion in the off-axis configuration. A holographic diffusing screen element laminated onto the image source provides uniform high brightness and uniform contrast over the entire field-of-view which is visible from an eyellipse sufficient to accomodate most of the driver population, minimizes the visual impact of any optical aberrations near the edge of the viewing area, and provides the non-pupil forming system with some of the desirable optical properties of a pupil forming system.

10 Claims, 4 Drawing Sheets

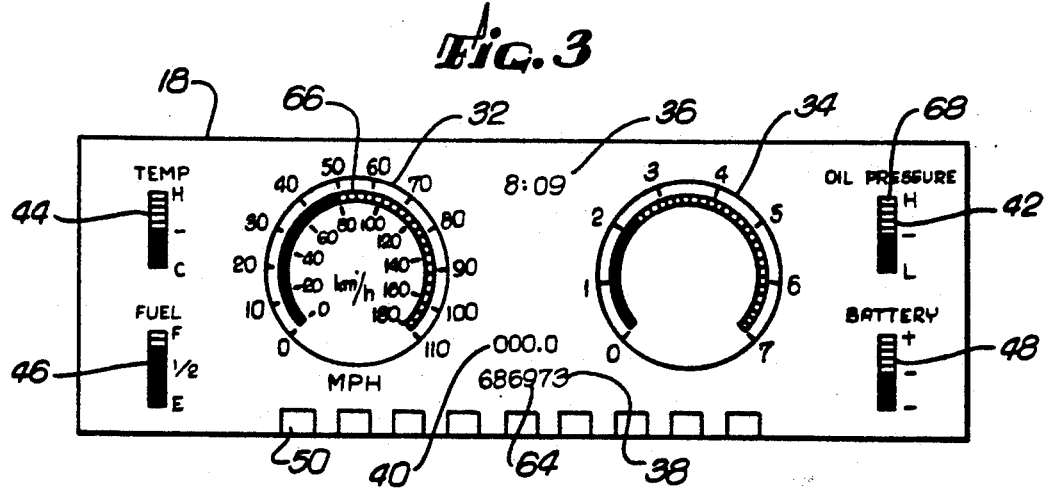
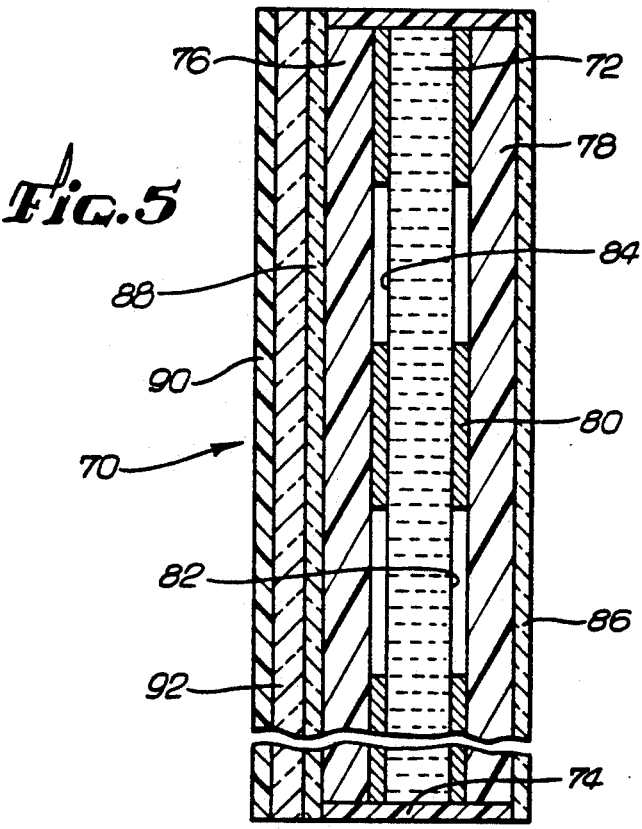
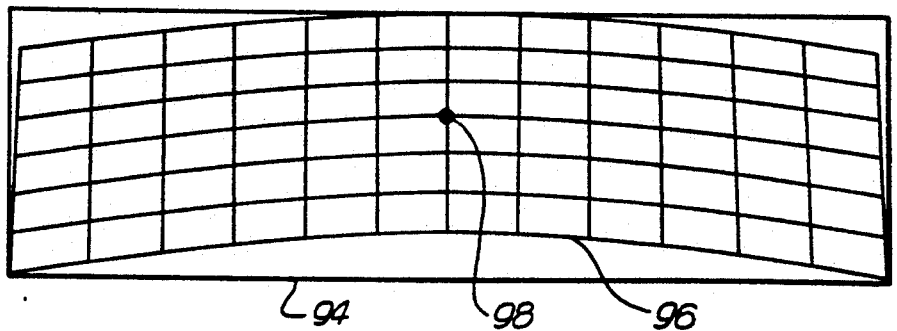

AUTOMOTIVE INSTRUMENT VIRTUAL IMAGE DISPLAY

BACKGROUND OF THE INVENTION

This invention relates generally to optical display systems and, more particularly, has reference to a new and improved system for displaying instruments in an automobile.

General production line automobiles typically have a plurality of instruments, indicators and gauges displayed on a dashboard panel behind the steering wheel. These instruments usually include a speedometer, a tachometer, a clock, an odometer, and a trip odometer, various auxiliary gauges for oil pressure, engine temperature, fuel level and battery charge, and a collection of system warning lights. In older cars, the instruments are often electro-mechanical devices with moving needle indicators. Newer models frequently use backlit direct view liquid crystal displays or self-illuminating vacuum flourescent displays.

Due to the limited space available in the interior of an automobile, the instrument panel is usually located relatively close (e.g. about two feet) to the driver's eyes. To read direct view instruments, the driver refocuses his eyes from the far range viewing (essentially at infinity) used to observe the road ahead to the near range viewing used to look at the instruments. While such systems generally have served their purpose, there remains a continuing desire for further improvements, particularly in the areas of instrument readability and reduced driver eye strain.

One foreign automobile manufacturer attempted to provide an improved instrument display with a viewing distance slightly beyond the normal dashboard panel position by mounting a flat folding mirror on the dashboard below a full-size vacuum fluorescent instrument display. This approach was unsatisfactory in several respects and left considerable room for improvement.

A need exists for an automobile instrument display system which minimizes driver eye strain and enhances instrument readability, particularly for older persons and persons who are far sighted or wear bifocals, by producing an instrument cluster image well beyond (e.g., about one foot or more) the face of the dashboard and a considerable distance (e.g., about four feet or more) from the driver's normal viewing position. The desired system would be configured to fit within the existing space/volume currently occupied by the conventional dashboard instrument panel, would provide a display format and viewing angle conditions which were similar to conventional direct view instrument clusters, would provide a display image having comfortable visibility and legibility under all ambient light conditions, would be mass-producible at a cost comparable to a conventional direct view instrument cluster, would be simple in structure, would have an electrical interface which was compatible with an automotive electrical system, and would provide good optical characteristics, especially as regards to image quality, disparity and color. Numerous problems are encountered in attempting to satisfy those needs.

For example, optical complications are caused by geometric conditions which are encountered in the typical automobile environment. For instance, the driver's head and eyes normally do not remain stationary but move throughout an elliptical viewing area known as the eye motion box or the eyellipse. Driver's also have different seated body lengths and prefer different seat height and position adjustments. An eyellipse of about 8" H ×5" V ×10" D centered at about 30.5" from the instrument panel will accommodate most of the driver population. The typical instrument panel viewing angle (i.e., the line-of-sight used to see the instrument panel from the eyellipse) is about 19° below horizontal and the angular subtense (i.e., the amount of scan used to see the entire instrument display) is about 24° H ×6° V.

Additional complications are caused by the problem of vertical disparity or dipvergence. When an object field is viewed through an optical system, each eye typically sees a somewhat different view. Vertical disparity is the angular difference along the vertical axis of an object point as viewed by each eye. Vertical disparity has a bearing upon driver viewing comfort. A driver's tolerance limit to vertical disparity influences the complexity of the display optics. An instrument display system should reduce vertical disparity to a level which is commensurate with driver comfort while not unduly complicating the display optics.

Still further complications are caused by the high ambient light conditions which are present in most automobiles. Ambient light includes direct sunlight and specular reflections from surrounding objects which can shine into the driver's eyes and reduce display visibility. The instantaneous dynamic range of an eye adapted to a typical horizon sky luminance of about 3,000 foot-Lamberts (fL) is on the order of about 600:1. Hence, the black level for this eye is about 5 fL and all stimuli at luminance levels of 5 fL or less look equally black. Hence, even if there were no transmission losses and no noise (i.e., ambient light falling on and being reflected from the display), the luminance desired for the bright symbols of an instrument display in order to provide the 2:1 contrast generally regarded as adequate for viewing line/graphic images would be about 10 fL. This brightness should be provided by the electrical power available in an automobile.

A uniform high contrast and uniform bright image of the instrument is also desired, even in these high ambient light conditions. However, the two conventional ways to diffuse light across a viewing area, i.e., opaque lambertian diffusion and high gain backlit diffusion, may be unsatisfactory in certain situations. In the case of lambertian diffusion, the light is scattered equally in all directions. Where the optical system utilizes the diffused light only within a small angular cone directed into the eye motion box, radiation outside this cone tends to become stray light which causes high background levels and reduced contrast ratio. High gain backlit diffusing screens scatter the light into a narrower angular cone and thus improve the effective optical efficiency, but the resulting display uniformity over the viewing area can be unsatisfactory. There may be an undesirable drop-off in brightness at the edge of the eye motion box.

Additional complications arise from the desire to provide a display system which is harmonious with the general styling of the automobile interior and which has high customer acceptance and appeal. In this regard, the system should be packaged to fit within the existing dashboard space now occupied by a conventional direct view instrument display, should be mass-producible at a reasonable cost, should provide a multi-color image, and should provide an image source whose stability, drift, latency and persistence are such that the image is not difficult to interpret nor aesthetically objectionable.

The present invention overcomes these problems and satisfies the need for an improved instrument display system.

SUMMARY OF THE INVENTION

Briefly, and in general terms, the present invention provides a virtual image display system for an automobile which creates a magnified image of an instrument cluster at a viewing distance which is substantially greater than the actual optical path length between the driver and the display, thereby enhancing instrument readability, minimizing driver eye strain, and reducing eye focus problems when transitioning between watching the road ahead and glancing at the instruments. By optically placing the instrument image deeper into what appears to be a dark tunnel, and by providing effective shielding against strong ambient light, the system improves display visibility and provides a high contrast, sharp and pleasing, multi-color instrument display against typical ambient background levels. The system is sufficiently small, thin and compact to fit within the tight space which is available in the instrument panel region of a dashboard and is sufficiently simple in structure and design for mass-production at a reasonable cost.

In a presently preferred embodiment of the invention, by way of example and not necessarily by way of limitation, the display system utilizes an optical imaging arrangement which includes an aspherical optical element, such as an off-axis mirror with power, to create a magnified virtual image of an instrument display at a distance of about four to twelve feet from the driver's nominal eye position and in the general direction of the dashboard panel region. Optical power achieves the desired eye-to-image distance notwithstanding vehicle design constraints which may limit the location of the display image source and other optical components in the system and which may limit the length of the optical path within the system. The aspheric surface of the mirror is computer-optimized to minimize aberrations, reduce vertical disparity between the driver's eyes to acceptable levels, reduce field curvature, and enhance system compactness by shortening the optical path length between the mirror and the image source, all with a relatively non-complex optical design.

The aspheric mirror is preferably generated by applying a simple metallic reflecting coating onto an injection-molded aspheric plastic substrate. The overall length of the optical system is reduced and the optics simplified by using the mirror in a non-pupil forming configuration. When a single aspheric surface is used as the entire optical system, chromatic aberrations are substantially reduced or eliminated and a particularly sharp color image is produced.

A display system embodying features of the present invention take advantage of the "apparent size" effect to provide a display field-of-view which is smaller than the existing angular subtense of a conventional direct view instrument display. This reduction in field-of-view reduces system size and thus facilitates installation into the limited space available in an automobile. The reduced system size also frees up dashboard panel space which can be used for mounting other instruments or controls.

The preferred embodiment of the invention utilizes a passive image source which is pre-distorted to compensate for distortion in the off-axis optical system and which provides a rectilinear virtual image of the object scene. A segmented liquid crystal display ("LCD") is the preferred passive image source because it has a relatively thin panel, high resolution, high reliability and low power consumption. Colors in the LCD image source are generated by appropriate color filters.

By using optical power in the system, the desired image size can be obtained with a miniaturized image source. Cost is particularly low with a miniaturized LCD source because the surface area is reduced.

The LCD panel is backlighted to avoid the shadow effect. Illumination is provided by a relatively inexpensive and durable, small filament incandescent lamp which is positioned at a remote location. A fiber optic bundle pipes the light to the LCD panel. This remote illumination scheme facilitates replacement of the bulb in case of failure and reduces heat build-up in the region occupied by the image source. The fiber optic bundle splits into a number of spaced-apart ends behind the LCD panel assembly. The ends separately illuminate the panel assembly to promote a particularly high degree of illumination uniformity across the LCD within a closer illumination distance.

A directional diffusing screen element is disposed between the illumination optics and the image source to diffuse the illumination light and provide uniform high brightness and uniform contrast over the entire field of view. In the preferred embodiment of the invention, the light from each of the ends of the fiber optic bundle is directed towards the LCD panel assembly where it is diffused by a transmission diffusion hologram laminated onto the rear of the assembly. The high efficiency and angular restrictive properties of the hologram cause the diffuse light from the LCD panel to be directed into the entrance aperture of the aspheric mirror in a uniform and efficient manner, thereby producing a particularly bright image display. Appropriate collimating and condensing optics are used to collect and focus the light from the lamp into the aperture of the fiber optic bundle to produce an image brightness which is sufficient for an effective display presentation at night or in the high ambient light conditions of daytime.

The diffusing screen also reduces the intensity of the light near the edge of the viewing area in a desired manner in order to minimize the visual impact of any optical aberrations, such as vertical disparity, residual distortion, horizontal focus and image motion, which may be present in those regions. By tailoring the intensity distribution of the diffusing screen over the viewing area, a non-pupil forming system can achieve some of the desirable optical properties of a pupil forming system without the inherent limitations of such a system.

In the preferred embodiment of the invention, a curved and tilted plastic glare shield is added after the aspheric mirror to protect the system optics and LCD panel. The curvature and angle of the glare shield are selected so that ambient reflections from within the motion eye box are focused off the front surfaces of the glare shield and away from the image source onto a black surface, thereby maintaining the high contrast of the virtual image display.

Other features and advantages of the invention will become apparent from the following detailed description taken in conjunction with the accompanying drawings, which illustrate, by way of example, the features of the invention.

DESCRIPTION OF THE DRAWINGS

FIG. 3 is an elevational view of a typical instrument cluster display produced by the system of FIG. 1;

FIG. 5 is an enlarged, sectional view of the colorized LCD image source and diffusion hologram used in the system of FIG. 1, and taken substantially along the line 5—5 in FIG. 2; and FIG. 6 is a graphical representation of the distortion curve used in making the image source of FIG. 1.

DETAILED DESCRIPTION OF THE PREFERRED EMBODIMENTS

Figure 1:
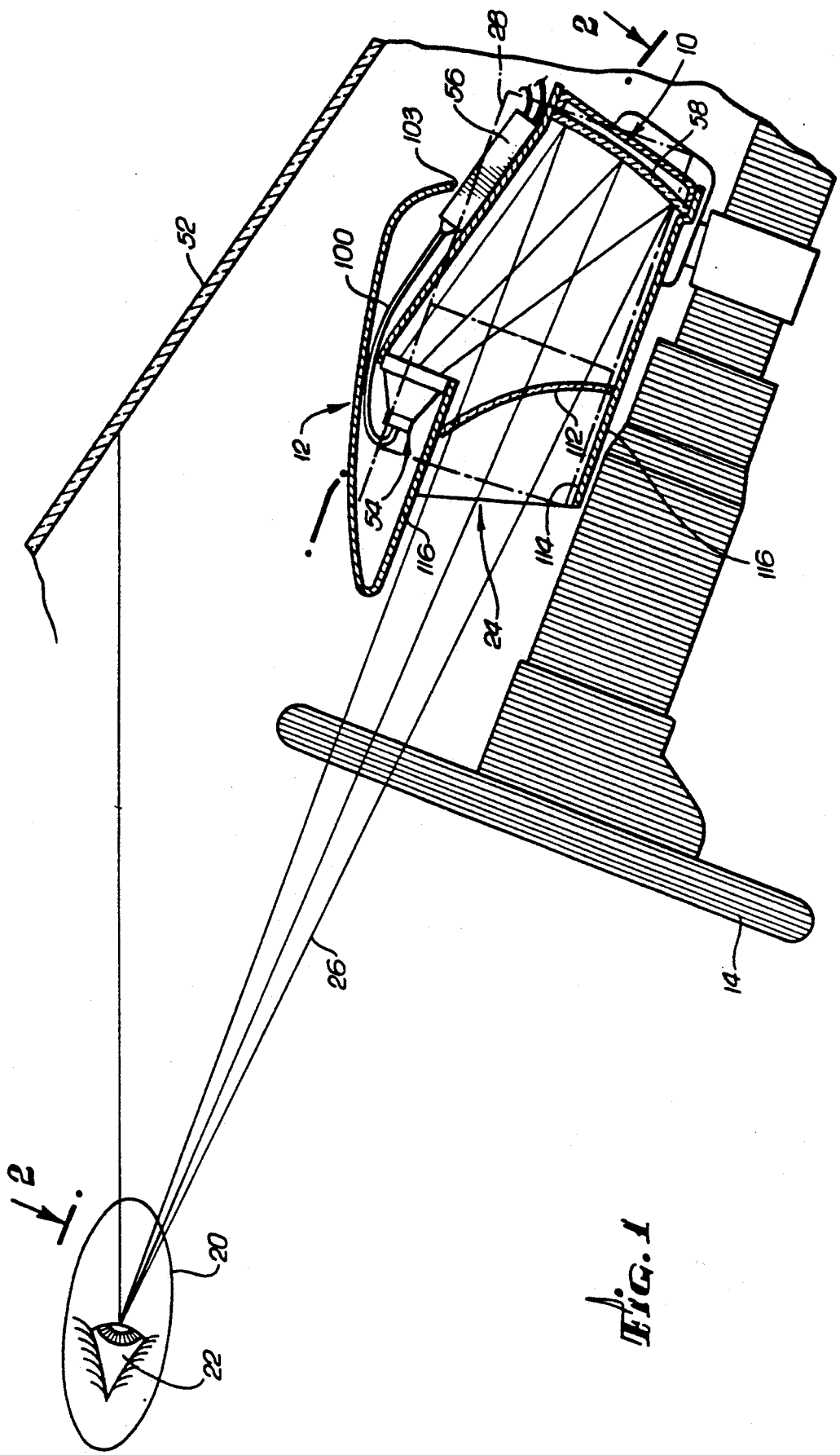
FIG. 1 is a vertical section view of a virtual image display system embodying features of the present invention and showing the system installed in the dashboard of an automobile.
Figure 2:
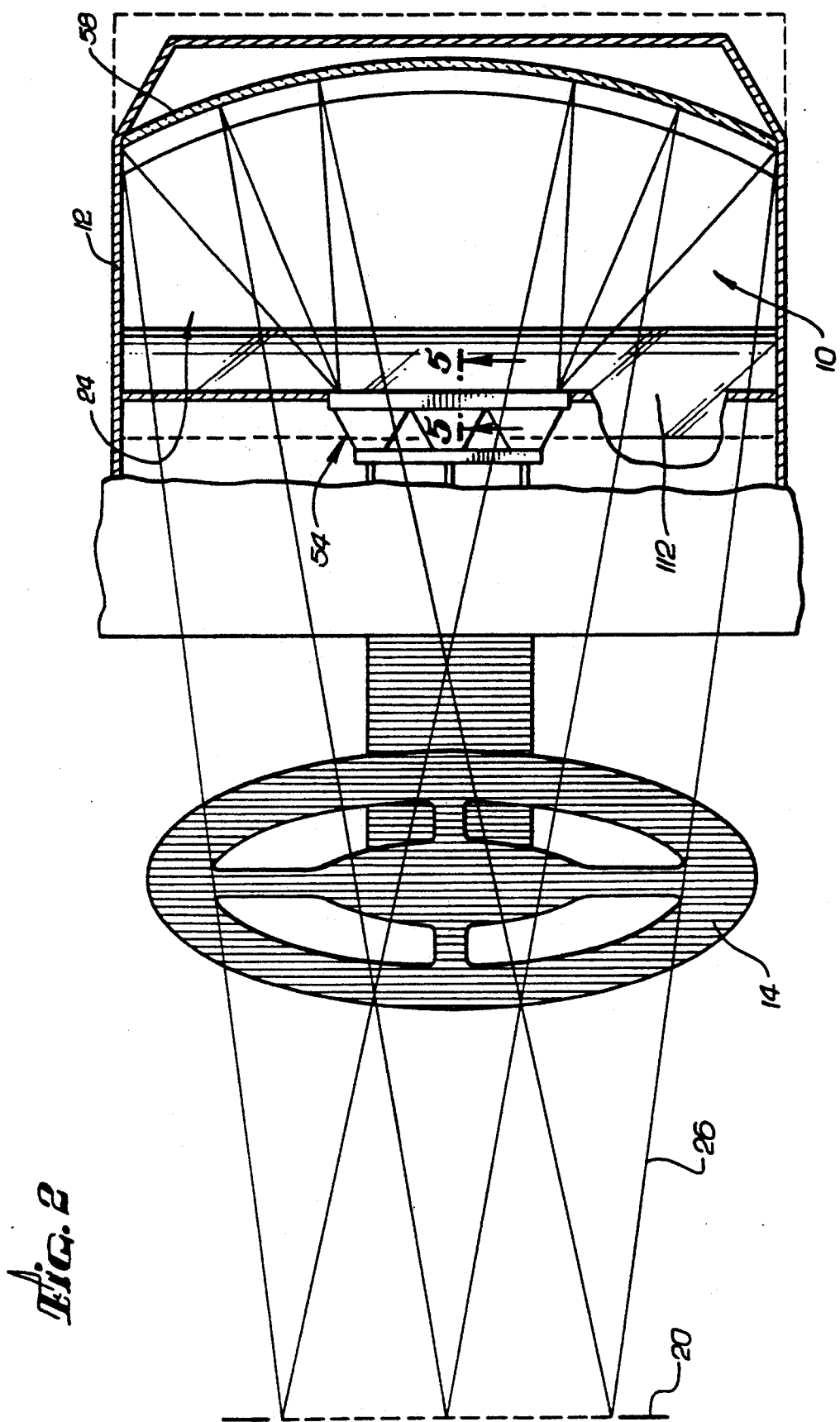
FIG. 2 is a sectional view of the system of FIG. 1, partly cut-away, and taken substantially along the line 2—2.

As shown in the drawings for purposes of illustration and with particular reference to FIGS. 1-4, the present invention is embodied in an optical display system, generally indicated by the numeral 10, which is mounted in the dashboard 12 of an automobile behind the steering wheel 14 and which produces a virtual image 16 (FIG. 4) of a primary instrument cluster 18 (FIG. 3) that can be viewed from an eye motion box 20 at the driver's location when the driver 22 looks down and scans across the dashboard panel region 24 in the manner illustrated schematically by the light rays 26.

A conventional direct view instrument assembly 28, consisting of a plurality of electro-mechanical gauges or backlit direct view liquid crystal displays (not shown), is shown in phantom lines in FIG. 1 to illustrate by comparison and in a general manner the size, configuration and location of the dashboard panel region 24 of the automobile. It will be immediately appreciated that the system 10 embodying features of the present invention is sufficiently lightweight and compact (e.g., typically about 10" W ×6" H ×8" D and weighing about 2-3 Kg.) to be packaged into the tight space which is available in the dashboard panel region 24.

Referring to FIG. 3, a typical instrument display format produced by the optical display system 10 is similar to a conventional direct view instrument display format and includes a speedometer 32, a tachometer 34, a clock 36, an odometer 38, a trip meter 40, an oil pressure gauge 42, an engine temperature gauge 44, a fuel gauge 46, a battery charge gauge 48, and a collection system warning lights 50 arranged in cluster fashion. To read these instruments while driving, the driver 22 momentarily redirects his eyes from the view of the road which he sees though the windshield 52 (FIG. 1) to the view of the instrument cluster 18 which he sees in the direction of the dashboard panel region 24.

In accordance with the present invention, the optical display system 10 creates a virtual image 16 of the instrument cluster 18 at a viewing distance which is substantially greater than the actual optical path length between the eyes of the driver 22 and the physical location of the system 10. This enhances instrument readability, minimizes driver eye strain, and reduces eye focus problems when the driver 22 transitions between watching the road ahead and glancing at the instrument cluster 18. The improvement is particularly significant for older persons who may have diminished eye focusing capability and for persons who are far sighted or wear bifocals and must pull their head back or tilt their head up to get a clear view of close objects. By optically placing the instrument cluster 18 deeper into what appears to be a dark tunnel, and by providing effective shielding against strong ambient light, the system 10 improves display visibility and provides a high contrast, sharp and pleasing multi-color instrument presentation against typical ambient background levels. The system 10 is simple in structure and design and can be mass-produced at a reasonable cost.

Figure 4:
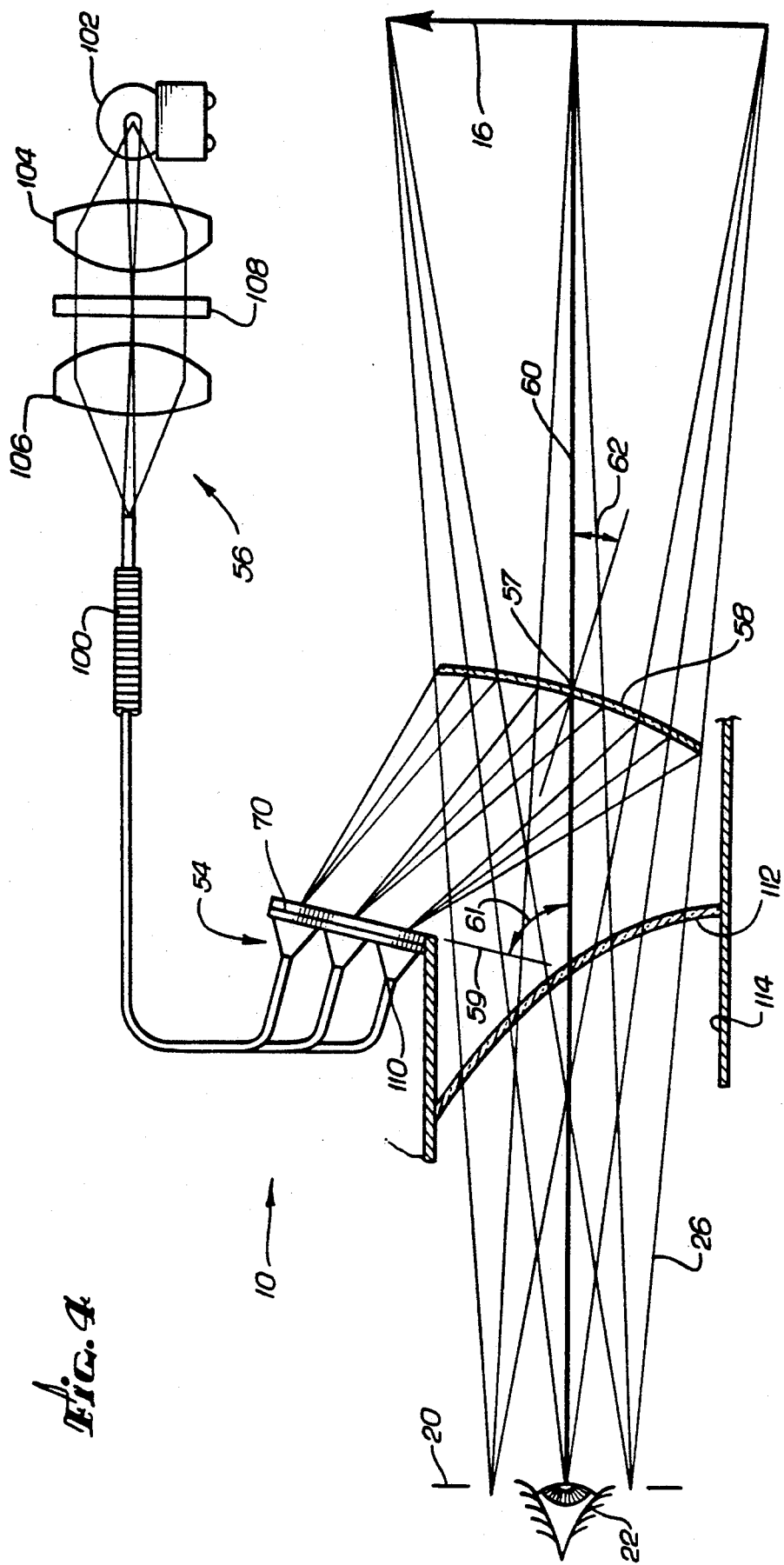
FIG. 4 is a schematic diagram of the display system of FIG. 1 which shows ray traces in the vertical plane.

Referring to FIG. 4, the preferred embodiment of a display system 10 incorporating features of the present invention includes a miniaturized image source 54 which produces an object scene display of the desired instrument cluster 18, an illumination system 56 which illuminates the image source 54, and an optical imaging element, such as an off-axis aspheric mirror 58 with power, which deviates the light from the image source 54 into the driver's eye motion box 20 and focuses the light to produce a magnified virtual image 16 of the instrument cluster 18 displayed by the source 54 at a considerable distance (e.g., about one foot or more) beyond the dashboard panel 24 and a considerable distance (e.g., about four feet or more) from the driver's normal viewing position within the eye motion box 20. Optical power achieves the desired eye-to-image distance notwithstanding vehicle design constraints which may limit the location of the image source 54 and other optical components in the system 10 and which may limit the length of the optical path within the system 10.

According to the "apparent size" effect, when an object at a greater distance subtends the same visual angle as a familiar object at a closer distance, the mind attributes a greater size to the more distant object. Hence, instruments seen in the virtual image 16 produced by the display system 10 appear to be larger than instruments of the same size physically located at the dashboard panel 24 even though both may subtend the same angle at the driver's eyes. The present invention takes advantage of this effect to simplify the optical design. For example, a virtual image subtending about 3° at a viewing distance of about six feet would appear to be approximately the same size as a 6° direct view display located at a viewing distance of about two feet. Hence, the field-of-view of the virtual image display system 10 can be reduced relative to the angular subtense of the conventional instrument assembly 28 without substantially degrading the perceived visibility and readability of the instrument display. With a reduced field of view, the system 10 can be more easily packaged into the limited space available in the dashboard 12 and can free up space in the dashboard 12 for other uses.

A virtual image display system 10 with a field-of-view of about 12° H ×3° V visible over an eye motion box 20 sufficient to accomodate most of the driver population (e.g., about 8" H ×4" V unvignetted) would provide a virtual image 16 of instruments of suitable size. By using a single continuous aspheric mirror 58 to fold the instrument cluster in the vertical plane, the full field-of-view can be shown within the desired eye motion box 20 with no obstructions or secondary folds in the path. When the single aspheric surface 58 is used as the entire optical imaging system, chromatic aberrations are substantially reduced or eliminated and the system 10 provides a particularly sharp color image.

The aspheric mirror 58 allows greater degrees of freedom in the design of the optical system and thus facilitates the task of providing a system 10 which has the image quality and physical characteristics desired for an automobile instrument display. In the preferred embodiment of the invention, the shape of the aspheric surface of the mirror 58 is computer-optimized to minimize aberrations, reduce vertical disparity and field curvature, and enhance system compactness by minimizing the radius of curvature of the mirror 58 and shortening the optical path length between the mirror 58 and the image source 54, all with a relatively non-complex optical design.

The overall length of the optical system is further reduced and the optics further simplified by using the mirror 58 in non-pupil forming configuration. A non-pupil forming optical system uses a lens group or, in the case of the instrument display system 10, the aspheric reflecting mirror 58 to magnify the image source 54 and produce a virtual image 16 at some distance from the driver 22. The virtual image 16 can be viewed optimally within a cone subtended by the mirror 58 but, as the driver's eye moves out of the optimal viewing cone, part of the image 16 begins to vignette (i.e., disappear). The further the driver 22 moves out of the central cone, the less of the image 16 he can see until eventually all of the image becomes vignetted. With a pupil-forming system, the optimal viewing region would be more confined and the virtual image would be completely vignetted when the driver's eyes moved out of the exit pupil. However, this added performance would come at the expense of additional optical elements (in the form of relay optics) and path length. The advantage of the non-pupil forming system resides in its relative simplicity. The overall length of the system is generally shorter than that of the pupil forming system which requires extra length to accommodate the additional relay optics. Any advantages offered by a pupil forming system in terms of aberration correction and distortion control are not essential in a look-down display such as the system 10, because the imagery in such a display is not being overlayed with the real world. Greater levels of distortion and lower accuracy thus can be tolerated for acceptable performance. The desired levels of vertical disparity are well within the reach of a non-pupil forming system.

To view the entire virtual image 16 from anywhere within the eye motion box 20, the size of the mirror 58 in a non-pupil forming system 10 is selected in accordance with the following equation:

$$H = 2L \tan(FOV/2) + (Y-5)(1-L/R)$$

where

H is the size of mirror 58;
L is the distance from the driver 22 to the mirror;
FOV is the display field-of-view;
Y is the eye box 20 (in inches) desired for unvignetted viewing; and
R is the image distance range (i.e., eye 22 to virtual image 16).

Where packaging size is a constraint, as is the case with a system intended for use in the interior of an automobile, it is advantageous to place the optical system as close to the viewer as possible to minimize the size of the optics. For example, with an eye-to-panel distance of about 30", a typical mirror 58 for a 12° field-of-view display would be about 8.5" wide. For a 24° field-of-view, the mirror 58 would be about 14.8 inches wide, which is about the same size as the conventional instrument assembly 28. In a preferred embodiment of the invention, the aspheric mirror 58 is about 9.0" W ×5.0" H with a thickness of about 0.25" or less (primarily for mechanical stability).

In one embodiment of the invention, the center 57 of the aspheric mirror 58 is located about 30" from the eye motion box 20 and about 5.6" from the face plane 59 of the image source 54 as measured along the line-of-sight axis (represented in FIG. 4 by the central light ray 60). The mirror 58 is oriented at an off-axis angle 62 of about 14.4° and the face plane 59 of the image source 54 is oriented at an angle 61 of about 78° with respect to the line-of-sight axis 60. The aspheric surface of the mirror 58 has about a 14" base radius which satisfies the following aspheric surface equation:

$$Z(X, Y) = R + \sqrt{(R^2 - (X^2 + Y^2))} + C5 * (X^2 - Y^2) + C8 * Y * (X^2 + Y^2)$$

where:
R = −14
C5 = −0.934197×10⁻³
C8 = −0.627995×10⁻³

X and Y are sample points (in inches) along the aspheric surface as defined by a pair of mutually othogonal axes which are tangential to the surface; and Z is the orientation (in inches) of the axis normal to the aspheric surface at the X,Y sample point.

Data for sample points along the aspheric surface are indicated in the following table, in which "Z" is the data for the spherical base curve and "Z" is the deviation of the aspheric surface from the base curve at the respective X,Y sample points:

| SAMPLE POINTS (in inches): | | | |
|---|---|---|---|
| X | Y | ΔZ | Z |
| +0.000 | −2.000 | +.008761 | −.134833 |
| +0.000 | −1.000 | +.001562 | −.034198 |
| +.0000 | +0.000 | +.000000 | +.000000 |
| +0.000 | +1.000 | +.000306 | −.035454 |
| +0.000 | +2.000 | −.001287 | −.144881 |
| +1.000 | +0.000 | −.000934 | −.036694 |
| +2.000 | +0.000 | −.003737 | −.147330 |
| +3.000 | +0.000 | −.008408 | −.333613 |
| +4.000 | +0.000 | −.014947 | −.598539 |
| +4.000 | −2.000 | +.013909 | −.719591 |
| +4.000 | +2.000 | −.036330 | −.769831 |

In a preferred embodiment of the invention, the aspheric mirror 58 is a replicated plastic mirror made of polycarbonate or some other optical material having physical properties which are consistent with an automobile environment. A metallic reflective coating is applied to the first aspheric surface of a plastic substrate which is preferably formed by injection molding.

The preferred embodiment of the invention utilizes a passive image source 54 which displays the desired object scene at the desired brightness and contrast, is packaged into the available area in the dashboard 12, provides the desired resolution and color, and has input power requirements which are compatible with the electrical system of an automobile, all at a relatively low cost. The packaging and cost features are enhanced, in part, by taking advantage of optical power in the display system 10. Optical power allows the image source 54 to be miniaturized, i.e., made smaller than the size of the desired instrument display to be seen in the virtual image 16.

Liquid crystal displays are used in numerous consumer and industrial applications and are particularly desirable for use in automotive displays. They have a relatively thin panel, a high resolution due to the stroke quality of the segments, a high reliability, a low cost, and a low power consumption. The thickness of an LCD panel is about 0.25" for relatively large panels (e.g., 5"×6"). The low drive voltage, typically in the range of about 2-10 volts, is also a desirable feature. LCDs have an operating and storage temperature range of about −40° C. to +85° C., but because switching speeds tend slow down at low temperatures, it may be desirable to add heater circuitry (not shown) to an LCD image source so that the display can continue to operate properly in cold weather within seconds of starting the automobile.

Segmented LCD panels are particularly desirable for use in the image source 54 because they can be configured with segmented digits 64 and bar graphics 66 (FIG. 3) to provide a conventional-looking instrument display format. A segmented LCD modulates light from a stationary illumination source to create what appears to be a moving image (e.g., a sliding indicator moving along a bar graph).

The number of segments 68 used in the bar graph displays 66, including for example the speedometer 32 and tachometer 34, will affect display cost because it will determine the complexity of the display and the electronics (not shown) used to drive it. A miniaturized source 54 has a particularly low cost because the surface area is reduced.

For an exemplary instrument cluster 18 where the tachometer 34 displays up to 9000 rpm and the speedometer 32 displays up to 200 km/hr, about three segments 68 per major division (1000 rpm or 10 km/hr) provide acceptable resolution. Where there are also six digits for the odometer 38, four digits for the trip meter 40, ten elements for each of the auxiliary gauges 42–48, and one element for the left-most digit of the clock 36, a total of two hundred twenty segments are needed, i.e., twenty-eight segments for the tachometer 34, sixty segments for the speedometer 32, forty segments for the auxiliary gauges 42–48, twenty-two segments for the clock 36, and seventy segments for the odometer 38 and trip meter 40. For a 2:1 multiplexed display using integrated driver circuits (not shown) which can drive thirty-two segments each, about twelve integrated circuit chips will be included on the substrate. The annunciator lights 50 need not be part of the LCD, and any portion of the display that does not change can be painted on the display face rather than being a LCD element. This exemplary image source 54 can be packaged to a size of about 1.25" H ×5.0" W.

Referring to FIG. 5, a typical segmented LCD panel 70 of the twisted pneumatic variety which is useful in the image source 54 includes an active liquid crystal layer 72 retained in a seal 74 between a pair of substrates 76 and 78. A pattern of spaced electrodes 80 are disposed along opposed surfaces 82 and 84 of the layer which have been chemically or physically treated to align the liquid crystal molecules. The electrodes 80 are selectively actuated to produce image pixels in a manner well known in the art. This entire structure is sandwiched between a pair of polarizers 86 and 88.

Colors are generated by appropriate color filters 90 which are laminated behind a diffusing screen 92 adhered to the rearward polarizer 88 or, in an alternative embodiment (not shown), are laminated between the polarizer 88 and the diffusing screen 92. Suitable color filters include dielectric filters and pigmented transparent filters. When used with the preferred holographic diffusion screen 92 discussed below, the color filters 90 are selected to pass the colors which are diffracted by the diffusing screen 92. A multi-color LCD includes a collection of differently colored areas.

Other types of image sources useful in the display system 10 include vacuum flourescent displays, PLZT displays, miniature electro-mechanical dials, and hybrid combinations of mechanical dials and electro-optics sources. Dot matrix displays (LCD-type or VF-type) are particularly useful image sources where a reconfigurable image is desired.

An alternative embodiment of the invention which provides reduced aberrations or a wider field-of-view in a compact display package utilizes an image source 54 which has a curved image surface (not shown) and a field lens/prism (not shown) positioned in front of the curved surface.

When the aspheric mirror 58 is used in an off-axis configuration, the shape of the image source 54 as seen in the virtual image 16 will be distorted. A geometry correction is introduced into the system to compensate for this distortion and produce a virtual image 16 which, as seen by the driver 22, is geometrically correct. The distortion normally is compensated by the design of the image source 54.

Specifically, the graphic pattern design of the image source 54 is pre-distorted to incorporate the geometry correction. In the case of a segmented LCD image source, the correction is built into the design by purposely distorting the artwork and the segment pattern in accordance with a distortion curve which is shaped to counterbalance the distortion in the off-axis configuration. Since the segmented LCD layout is custom configured, the artwork used to make the display can be pre-distorted with little or no increase in product cost and with little or no degradation of image quality.

A distortion curve for the particular aspheric surface described above is illustrated in FIG. 6. The desired rectilinear virtual image 16 is represented by a rectangle 94 having dimensions of about 2.364" W ×0.699" H. The face of the LCD image source 54 is represented by a curvilinear grid pattern 96 which is disposed within the rectangle 94 about the center point 98. By arranging the LCD segments 68 of the image source 54 in a pattern that is pre-distorted in accordance with the grid pattern 96, the distortion present in the off-axis configuration is compensated and the virtual image 16 produced by the source 54 will be substantially rectilinear.

For a passive (i.e., non light emitting) image source 54, such as the segmented LCD panel 70, illumination is provided by an external illumination system 56. In order to minimize the amount of wattage consumed by the illumination system 56, the display should be made as transmissive as possible and yet maintain uniform high brightness and uniform contrast over the entire eye motion box 20.

A holographic diffuser diffracts rather than scatters the light. All of the diffused illumination can be directed uniformly into an entrance pupil of the optical system and the diffraction angle can be readily adjusted to fit the optical configuration, thus providing high uniformity and high gain. With the eyellipse and eye-to-panel viewing distance encountered in the typical automobile environment, a hologram diffusing screen disposed between the illumination system 56 and the image source 54 diffuses the illumination light and provides a substantial improvement in display brightness.

Accordingly, referring again to FIG. 5, it is preferred that the diffusing screen element 92 adhered to the LCD panel 70 a transmission hologram diffusing screen and, more particularly, be a directional diffusing screen generally of the type described in U.S. Pat. No. 4,372,639, entitled "Directional Diffusing Screen", issued to Kenneth C. Johnson, the entire disclosure of which is incorporated herein by reference. The hologram is recorded so that the exit aperture of the diffusing screen 92 coincides with the entrance aperture of the reflecting mirror 58. The high efficiency and angular properties of the transmission hologram thus direct the diffused light from the LCD panel 70 into the mirror aperture in a uniform and efficient manner. By so concentrating and directing the diffuse light, the virtual image 16 is provided with uniform high brightness and uniform contrast over the entire field-of-view when viewed from within the desired eye motion box 20.

An alternative diffusing screen which is particularly useful in the display system 10 is the aspheric lenticular screen made by Protolyte. The lenticular screen has some of the desirable optical properties of a holographic diffusing screen but it is less sensitive to the wavelength and angle of incidence of the incoming light. Image source tilt can be substantially reduced or eliminated when the lenticular screen is used.

The directional properties of the holographic diffusing screen 92 have the advantage of minimizing the visual impact of any aberrations, such as vertical disparity, residual distortion, horizontal focus and image motion, which may be present near the edge of the viewing area. By concentrating the light into the entrance aperture of the mirror 58, the screen 92 reduces the intensity of the light at the edges of the viewing area in a desired manner and thus makes any aberrations there more tolerable to the driver 22. By tailoring the intensity distribution of the diffusing screen 92 over the viewing area, the non-pupil forming system can be made to achieve some of the desirable optical properties of a pupil forming system without the inherent limitations of such a system.

Because the diffusing screen 92 is not used as an imaging element, the quality of the hologram is less critical. The screen 92 can be fabricated with high yield and low cost for automotive display applications. A suitable technique for making the transmission hologram diffusing screen 92 is described in the aforementioned Johnson patent. For a multi-color image source 54, the screen 92 includes a plurality of holograms which are recorded at different wavelengths and respectively located such that the screen 92 is made responsive to different colors in different areas.

The illumination system 56 illuminates the image source 54 in a manner which provides the desired brightness, color balance, and uniformity.

With a holographic diffusing screen 92 it is particularly desirable to use a small point light source such as a small filament incandescent lamp or a fiber optic bundle. In a preferred embodiment of the invention, a fiber optic bundle 100 is used to pipe illumination to the LCD panel 70 from a remotely located lamp 102. The remote location is selected so that the lamp 102 is conveniently accessible for service or replacement in the case of lamp failure. The remote location also reduces heat build-up in the region occupied by the image source 54. In one embodiment, the lamp is mounted adjacent a rearward open end 103 of the dashboard 12.

The light from the lamp 102 is collected and focused into the aperture of the fiber optic bundle 100 by an appropriate collimating aspheric lens 104 and an appropriate condensing aspheric lens 106. A filter 108 between the lenses 104 and 106 filters out light in the infared wavelengths to facilitate the use of plastic fiber optics which have relatively low heat tolerance. The wattage of the lamp 102 is selected to take account of light loss and reduced light intensity which may occur when the illumination passes through the fiber optic bundle 100 and the collimating and condensing optics 104 and 106.

A particularly inexpensive and durable lamp 102 which is useful in the illumination system 56 is an incandescent lamp. A number of varieties exist which are capable of producing the luminance output desired to properly illuminate the image source 54 and which are compatible with the voltage and power forms typically found in an automobile.

In the case of a remote lamp where a fiber optics bundle 100 is used to pipe the light to the LCD panel 70, it is desirable to use a lamp 102 with a small filament size in order to increase the collection efficiency into the optical fiber 100. An example of such an incandescent lamp is the lamp #1874. The nominal design voltage of that lamp is about 3.7 volts and the nominal power consumption is about 10 watts. The lamp has a high luminous output and is therefore particularly well suited for a fiber bundle configuration. By using an f/1 condensing optics system of the type shown in FIG. 1, the lamp should produce an image brightness which is sufficient for an effective display presentation at night or in the high ambient light conditions of daytime.

When the image source 54 includes the segmented LCD panel 70, the exit aperture of the fiber optic bundle 100 is arranged to provide a backlit lighting scheme. Backlighting substantially eliminates the shadow effect which can be caused by the gap distance between the active liquid crystal layer 72 and the diffusing element 92 adhered to the LCD panel 70.

Referring to FIG. 4, the fiber optic bundle 100 extends from the incandescent lamp 102 and preferably terminates behind the LCD panel assembly 70 in a plurality of spaced-apart ends 110. The light from each of the ends 110 is directed through the panel 70 where it is diffused by the transmission hologram diffusing element 92 and filtered by the color filter 90. By splitting the fiber bundle 100 in this manner, a high degree of illumination uniformity is achieved across the panel 70 within a closer illumination distance. By splitting the fiber 100 into a plurality of endings 110, each about an inch apart, the desired uniformity can be achieved with the endings 100 only about 1" from the panel 70.

Unwanted reflections caused by ambient light conditions are substantially reduced or minimized by proper selection and orientation of optical surfaces in the display system 10.

The primary source of unwanted ambient light in the display system 10 is the diffuse reflection of the outside ambient (i.e., the sun and sky) off of the driver 22 and the interior of the automobile. Through proper design of the display system housing, direct illumination by outside ambient can be substantially blocked.

Referring again to FIG. 1, the preferred embodiment of the invention includes a display system 10 which is enclosed at the front by a curved, plastic sheet, glare shield 112 oriented at an angle of about 45° with respect to the line-of-sight axis. The shield 112 traps first surface reflections off of the sides of the display housing and off the glare shield 112 itself. The shield 112 is mounted in the plane between the bottom of the image source 54 and the bottom of the mirror 58 to prevent foreign objects from falling into the optical system. The curvature and angle of the shield 112 are selected so that any ambient reflection from the eye box area 20 is directed away from the image source 54 and into a light trap (e.g., a black surface 114 on the top of a lower projecting portion 116 of the dashboard 12), to preserve the high contrast of the virtual image 16.

The surface quality of the glare shield 112 is made high so that residual striae or defects therein will have minimal impact on the optical performance of the system 10. A suitable glare shield 112 is an optically clear plate or a neutral density filter. The shield 112 is preferably made of a contrast enhancement filter material such as the Didymium glass filter developed for use as a contrast enhancement faceplate for a color CRT display.

First surface reflections off of the image source 54 are substantially minimized or eliminated by tilting the face of the source 54 towards the interior of the display housing or by applying a broadband anti-reflection coating thereto. Light baffles (not shown) and light absorbing paint on the interior surfaces of the display housing also may be used to further reduce ambient reflections.

From the foregoing it will be appreciated that the present invention provides an inexpensive and mass-producible display system with optical power which is compatible with the styling and limited space available in the interior of an automobile and which creates a high contrast, sharp and pleasing multi-color image of a typical automotive instrument cluster at a viewing distance which is substantially beyond the face of the dashboard, thereby enhancing instrument readability and minimizing driver eye strain.

While several particular forms of the invention have been illustrated and described, it will be apparent that various modifications can be made without departing from the spirit and scope of the invention.

We claim:

1. An optical display system comprising image source means for providing an object scene, said image source means including a liquid crystal display providing said object scene, an illumination means for illuminating said image source means and including an incandescent lamp, a fiber optic bundle connecting said image source means and illumination means, said display system further comprising a non-pupil forming aspheric mirror with power stationarily diposed in a dashboard and shaped to reduce an optical path length between said image source means and an eye motion box, to reduce vertical disparity between the eyes of a driver, and to reduce field curvature of a magnified virtual image created by said system, said mirror deviating light from said image source means through an off-axis angle into said eye motion box to create said magnified virtual image of said object scene at a viewing distance greater than said optical path length between said image source means and said eye motion box, said object scene being predistorted in said image source means to compensate for distortion introduced by said off-axis angle.

2. Apparatus as set forth in claim 1, wherein said image source means comprises a segmented liquid crystal display.

3. Apparatus as set forth in claim 1, wherein said image source means comprises a passive image source, and further comprising illumination means for illuminating said passive image source, and holographic diffusion means disposed between said illumination means and said passive image source for diffusing light from said illumination means which illuminates said image source means.

4. Apparatus as set forth in claim 1, further comprising holographic directional diffusing means for directing light from said image source means into an entrance aperture of said aspheric mirror.

5. Apparatus as set forth in claim 3, wherein said holographic diffusion means comprises a transmission hologram.

6. Apparatus as set forth in claim 1 wherein said liquid crystal display includes a liquid crystal layer and further including a transmission hologram means disposed between said fiber optic bundle and said liquid crystal layer for receiving light from said bundle and for applying the light from said bundle to uniformly backlight said layer.

7. The apparatus of claim 1 wherein said liquid crystal display has a rear surface positioned to receive light from said fiber optic bundle and further comprises an active liquid crystal layer and a diffusing screen means located between said liquid crystal layer and said rear surface for diffusing light received through said rear surface from said fiber optic bundle and for directing the diffused light toward said liquid crystal layer, and wherein the said fiber optic bundle further includes a plurality of ends uniformly spaced apart to uniformly illuminate said rear surface.

8. The apparatus of claim 7 wherein said ends are spaced apart from each other and are spaced from said rear surface so as to supply light directly to said rear surface.

9. The apparatus of claim 8 wherein said rear surface is substantially continuous and contains no light-transmitting apparatus.

10. The apparatus of claim 7 wherein said diffusing screen means comprising a transmission hologram.

* * * * *